US005579060A

United States Patent [19]

Elberbaum

[11] Patent Number: 5,579,060

[45] Date of Patent: Nov. 26, 1996

[54] DATA TRANSMITTER FOR SELECTIVELY TRANSMITTING DATA TO RECEIVERS VIA TRANSMISSION LINES SWITCHED ON OR OVER IN SYNCHRONIZATION WITH AN EXTERNAL SYNCHRONIZING SIGNAL

[75] Inventor: David Elberbaum, Tokyo, Japan

[73] Assignee: Elbex Video, Ltd., Tokyo, Japan

[21] Appl. No.: 404,426

[22] Filed: Mar. 15, 1995

[51] Int. Cl.$^{6}$ .................................................. H04N 5/268

[52] U.S. Cl. .................................................. 348/705; 348/706

[58] Field of Search .................................... 348/705, 706, 348/722, 461, 469, 473; 375/85.6; 340/825.5; H04N 5/268

[56] References Cited

U.S. PATENT DOCUMENTS 4,603,352 7/1986 Kaneta et al. .
4,943,864 7/1990 Elberbaum .
4,989,085 1/1991 Elberbaum .
5,054,022 10/1991 van Steenbrugge .................... 348/706
5,335,014 8/1994 Elberbaum .
5,343,193 8/1994 Shoda et al. ............................ 348/705

*Primary Examiner*—Victor R. Kostak
*Attorney, Agent, or Firm*—Helfgott & Karas, P.C.

[57] ABSTRACT

An apparatus for selecting information signals includes a plurality of transmitters, each of which processes an electrical information signal preferably including a video signal. A plurality of receivers selectively receive that video signal. A plurality of information transmission lines connect each receiver to the plurality of transmitters. A generator for generating an external synchronizing signal generates and feeds an external synchronizing signal to the plurality of transmitters and the plurality of receivers.

21 Claims, 12 Drawing Sheets

120
18
TV Camera
24
58
26
Transmitter
28
12
16
Driver
124
Selector
Reciever
30
32
20
Ext. Sync. Generator
P1
48
22
CONTROL CIRCUIT
104

DATA TRANSMITTER FOR SELECTIVELY TRANSMITTING DATA TO RECEIVERS VIA TRANSMISSION LINES SWITCHED ON OR OVER IN SYNCHRONIZATION WITH AN EXTERNAL SYNCHRONIZING SIGNAL

BACKGROUND OF THE INVENTION

1. Field of the Invention

This invention relates to an information signal selecting apparatus for transmitting an electrical video signal from a plurality of transmitting means to each of a plurality of receiving means and for selectively receiving the transmitted video signal by each receiving means.

2. Description of the Prior Art

In a monitoring television system used as an information transmission system, at least one television monitor and one video recorder are connected through an electronic matrix switch to a plurality of television cameras and a plurality of transmission lines, for selectively connecting at least one camera for display through the monitor and record another camera signal onto the video recorder. The electronic matrix switch is used also for sequentially connecting a plurality of the television cameras to a monitor and independently recording other camera signals in sequence onto the video recorder. Such electronic matrix switch uses a centralized controller for the selection of all the outputs, be it a single television camera or sequencing multiple television cameras, for displaying on the monitor or recording independently any single or multiple camera signals in sequence onto the video recorder.

However, in a well known electronic matrix switching used for a system of this kind, as the number of television cameras and monitors or video recorders increase, the centralized switching and coordination become more complex, requiring larger software and hardware capacity to control the multiple individual independent outputs. Thereby, as the system grows, the matrix switching control becomes costly and inefficient.

Further, well known electronic matrix switches do not employ synchronized switching and the selected images displayed on a monitor are often disturbed during and immediately after the switching-over from one television camera to another.

In such an information switching system, it is preferable to mutually lock the internal synchronizing signals of a plurality of television cameras and the electronic switching time to an external synchronizing signal, in order to prevent the picture image on the monitor from being disturbed during and immediately after the switching operation from one television camera to another.

As the one of the devices for synchronizing a plurality of television cameras, there is known an apparatus for transmitting a vertical synchronizing signal and a horizontal synchronizing signal or composite synchronizing signal used in a television system. Another known apparatus is an apparatus for transmitting a vertical drive signal and a horizontal drive signal, and driving the television camera and its deflection circuits by the transmitted vertical drive signal, and the horizontal drive signal.

In any of the above known devices of the type under discussion, as the transmitted synchronizing signal itself is a train of pulses, which can be easily influenced by noise, the transmission of a synchronizing signal requires the use of a coaxial cable with its high shielding effect, which makes it costly for systems with a plurality of television cameras.

Another known apparatus for synchronizing a plurality of television cameras, is an apparatus for transmitting an external synchronizing signal from an external synchronizing generator to the television cameras by injecting the external synchronizing signal into the video signal transmission line and locking an internal synchronizing signal generator of the television camera by means of the transmitted external synchronizing signal. Such an apparatus is disclosed in U.S. Pat. No. 4,603,352 the contents of which are incorporated herein by reference.

SUMMARY OF THE INVENTION

An object of the present invention is to eliminate the centralized controller from controlling all the switching operations of all the independent outputs and to make it simple and easy to control the selection independently from any of the outputs by providing each independent output with individual controller. Another object of present invention is to provide smooth synchronized switching over from one transmitting means to another without any disturbance to the reproduced images, even when a large number of transmitting means and receiving means are involved.

Yet another object of the present invention is to provide each individual controller with individual remote controlling of any and all television cameras connected to the matrix switcher.

An apparatus for selecting information signals according to the present invention comprises a plurality of transmitting means, each processing an electrical information signal including a video signal a plurality of receiving means for selectively receiving the information signal, a plurality of information transmission lines for connecting each receiving means with the plurality of transmitting means, and an external synchronizing signal generating means for generating an external synchronizing signal and applying the same to the plurality of transmitting means and to the plurality of receiving means.

Each transmitting means includes a circuit for feeding the information signal to the plurality of receiving means through the corresponding information transmission lines. Each receiving means includes a selection circuit for selecting one of the plurality of corresponding information transmission lines or switching over from one information transmission line to another. The selection and the switching-over timing of the information signals in the plurality of the receiving means is synchronized with the external synchronizing signal.

Each information transmission line corresponds to a combination of the receiving means and transmitting means, and each transmitting means transmits an information signal to the plurality of receiving means through the corresponding information transmission lines. The information signals from the plurality of transmitting means are inputted to each receiving means. Therefore, each receiving means can be connected to any one of the plurality of transmitting means for receiving an information signal by selecting one of the plurality of corresponding information transmission lines.

The switching-over of the information signals is timed by an external synchronizing signal to occur precisely along with the vertical synchronizing timing, thereby providing an uninterrupted synchronizing process and the reproduced video images are not disturbed during and immediately after the switch-on or switch-over operation.

According to the present invention, each receiving means is connected to a plurality of transmitting means through a plurality of corresponding information transmission lines, and the switch-over timing of the information signals in the plurality of receiving means is synchronized with the external synchronizing signal. Therefore, even though a large number of transmitting means and receiving means are involved, any of the information transmission lines connecting the transmitting means and the receiving means can be synchronously switched on or switched-over by a simple apparatus without disturbing the reproduced video images.

The apparatus of the present invention further comprises a plurality of video signal generating means, such as television cameras, respectively connected to the plurality of transmitting means for feeding the video signal to the corresponding transmitting means. Each video signal generating means includes an internal synchronizing signal generation circuit for generating an internal synchronizing signal synchronized with the external synchronizing signal.

According to the present invention, the external synchronizing signal is a pulse signal having a voltage level higher than the maximum voltage level or lower than the minimum voltage level of the video signal. Each transmitting means includes a circuit for injecting the external synchronizing signal into a transmission line connected to the video signal generating means. Each video signal generating means further includes a level comparator circuit for extracting the external synchronizing signal by comparing the signal level of the external synchronizing pulse signal with a reference signal having a predetermined voltage and feeds the extracted external synchronizing signal to the internal synchronizing signal generation circuit. Since the external synchronizing pulse is generated during the vertical blanking period of the video signal, the external synchronizing signal can be transmitted commonly through the same transmission line used for transmitting the video signal without affecting the video signal.

In an embodiment, each transmitting means may preferably include a circuit for removing the external synchronizing signal from the output signal fed through the corresponding information transmission lines to the receiving means. Thereby, since the external synchronizing signal can be removed from the video signal transmitted through the information transmission lines, the external synchronizing signal does not influence the receiving means input circuits and the video signal can be flawlessly received.

In an embodiment, each video signal generating means may further include an identification code generation circuit for generating an identification code signal corresponding to an identification number, respectively allotted to each video signal generating means, for injecting the identification code signal into a video signal fed to the transmitting means. At least one receiving means further includes an identification code signal processing means for extracting the identification code signal from the output signal of the selection circuit and for feeding a signal corresponding to the extracted identification code signal to the video signal processing means.

The identification code signal processing means preferably includes a memory for storing identification data for each allotted code number, an extraction circuit for extracting the identification code signal from the output signal of the selection circuit and to generate a decoded signal by decoding the extracted identification code signal, and a controller for retrieving the identification data of the decoded signal from the memory and for superimposing the retrieved identification data onto the video signal. Thereby, the processed video signal can be identified by the identification code signal processing means for verification of the video generating means which is transmitting the video signal, thereby, providing the basis for error free controlling of the video generating means.

The apparatus of the present invention may further comprise a control means for generating and feeding a control signal combining a coded control command along with the identification code signal, decoded and fed by the extraction circuit, for controlling the video signal generating means. The coded control command is fed to the video signal generating means for operating the video signal generating means only when the identification code signal, combined into the control signal, corresponds to the identification number allotted to the video signal generating means being controlled. Thereby, only a specific video signal generating means, having its identification code extracted and decoded by the control means during the controlling process, can have its allotted identification number coincide with the identification code extracted from the control signal fed from the control means. Therefore, any specific video signal generating means can be verifiable and accurately controlled.

The control signal is injected into a video transmission line connecting the video signal generating means to the transmitting means during the vertical blanking period of the video signal, and the video signal generating means may further include a control signal processing means for extracting the control signal from the video transmission line and for feeding the extracted control signal only when the identification code signal, which is combined into the control signal, corresponds to the identification code allotted to it. Since the control signals are transmitted during the blanking period of the video signal they can be transmitted to the video signal generating means from the transmitting means through a common transmission line without disturbing the video signal.

Each transmitting means preferably further includes a signal mixing means for generating a mixed signal composed of a video signal and an audio signal by injecting the audio signal into the video signal and feeding the mixed signal to a plurality of corresponding information transmission lines. Thereby, both the mixed video signal and the audio signal can be transmitted between the transmitting means and the receiving means through a common information transmission line.

Each video signal generating means preferably further includes a signal mixing means for generating a mixed signal composed of a video signal and an audio signal by injecting the audio signal into the video signal and feeding the mixed signal to the corresponding transmitting means. Thereby, both the video signal and the audio signal can be transmitted between the video signal generating means and the transmitting means through a common transmission line.

Each receiving means may further include an audio signal retrieving means for outputting an audio signal by retrieving the audio from the mixed signal.

Each receiving means may further include a control signal driver for feeding the control signal to the plurality of information transmission lines in the reverse direction to the propagation direction of the video signal. Each transmitting means preferably further includes a control signal extractor for extracting the control signal from the information transmission line and for feeding the extracted control signal to the corresponding video signal generating means. Thereby, both the video signal and the control signal can be transmitted from the receiving means to the video signal generating means through the transmitting means and through a common transmission line.

Each transmitting means can feed the control signal to the video signal generating means by injecting the control signal into the video transmission line connecting the transmitting means to the video signal generating means or through a separate control transmission line.

The apparatus of the present invention may comprise an individual control means included in each receiving means for individually controlling the selection circuits, and a master controller for supervising or coordinating the controlling state of all control means in order to prevent any conflicting or prohibited selection.

The apparatus of the present invention may comprise an individual control means in each receiving means for individually controlling the video signal generating means through the information transmission line, and a master controller for supervising the controlling state of all control means in order to prevent any conflicting, prohibited or error control command.

In addition, the master controller can override and control each of the control circuits of the receiving means and each of the video signal generating means connected to the plurality of transmission lines.

BRIEF DESCRIPTION OF THE DRAWINGS

The foregoing objects and features of the present invention will become apparent from the following description of preferred embodiments of the invention with reference to the accompanying drawings, in which:

FIG. 6A is a block diagram of a code extraction circuit of a modified embodiment;

DETAILED DESCRIPTION OF PREFERRED EMBODIMENTS

Figure 1:
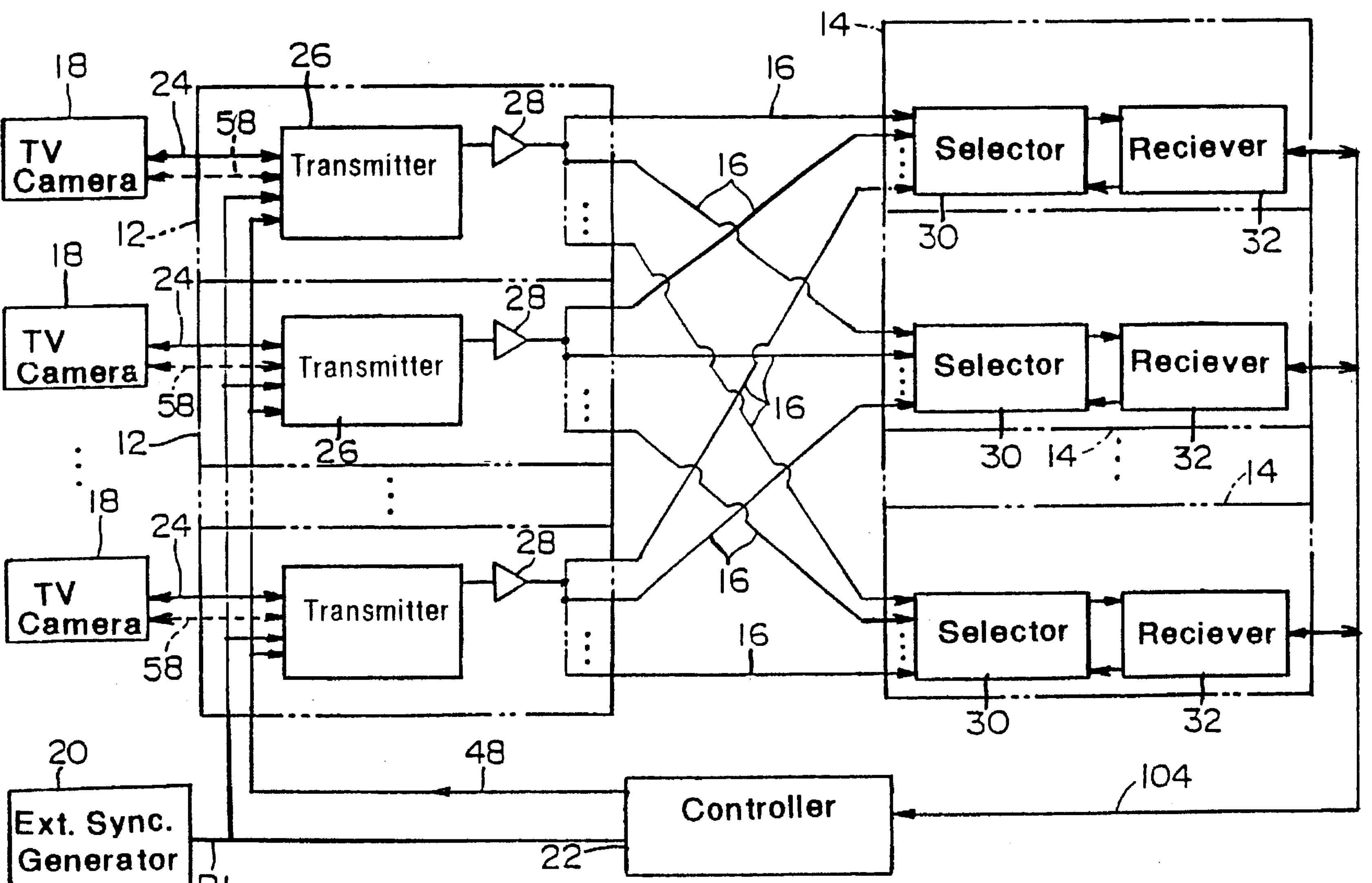
FIG. 1 is a block diagram of an apparatus for selecting information signals of a preferred embodiment of the present invention.

FIG. 1 shows an information signal selecting apparatus 10 for selecting information signals as a preferred embodiment when applying the present invention to a closed circuit television system such as a monitoring system. An information signal includes at least a video signal. In the following description, the video signal may be a multiplex video signal or a composite video signal.

Referring to FIG. 1, the information signal selecting apparatus 10 comprises a plurality of transmitting apparatuses 12 for transmitting information as an electrical information signal, a plurality of receiving apparatuses 14 for receiving the transmitted information signal, a plurality of information transmission lines 16 for carrying the information signal, a plurality of television cameras 18 respectively connected to the transmitting apparatuses 12 for outputting a video signal to the corresponding transmitting apparatuses 12, an external synchronizing signal generation circuit 20 for synchronizing the television cameras and the control circuits, and a control circuit 22 for outputting a control command to the transmitting apparatus 12 and the receiving apparatuses 14.

Each information transmission line 16 corresponds to a combination of the transmitting apparatus 12 and the receiving apparatus 14. Therefore, each transmitting apparatus 12 is connected to all the receiving apparatuses 14 through the plurality of information transmission lines 16 extending from the transmitting apparatus, while each receiving apparatus 14 is connected to all the transmitting apparatuses 12 through the plurality of information transmission lines 16 extending from the receiving apparatus. Thus, the number of arranged information transmission lines 16 corresponds to the product of the number of transmitting apparatus 12 and the number of receiving apparatuses 14.

The transmitting apparatuses 12, the receiving apparatuses 14, the information transmission lines 16, the external synchronizing signal generation circuit 20 and the control circuit 22 are mounted in a monitoring room. On the other hand, the television cameras 18 are mounted randomly anywhere for monitoring near or remote locations. Each of the transmitting apparatus 12 are connected through a video signal transmission line 24, such as a coaxial cable, to a television camera 18.

A transmission circuit 26 of each transmitting apparatus 12 receives a video signal from the corresponding television camera 18 through the video signal transmission lines 24 and feeds the received signal to a driver 28 for transmitting the received video signal as an information signal to all receiving apparatuses 14 through the information transmission lines 16. Thus, the driver 28 acts as a distribution circuit for distributing information signals to the plurality of information transmission lines 16. The driver 28 can be a circuit constructed from a readily available buffer I.C. or using wide band amplifier made of transistors and discrete components. An independent selection circuit 30, composed of a plurality of electronic switches corresponding to the information transmission lines 16 is incorporated in each receiving apparatus 14 for receiving information signals transmitted from the plurality of transmitting apparatuses 12 and switch on one or more of the electronic switches for connecting one or more information transmission lines 16 to the receiver circuit 32. Thereby, any one or more information signals transmitted through the information transmission lines can be selected and fed from the selection circuit 30 to the receiver circuit 32.

The frequency of an external synchronizing signal P1 is related to the vertical frequency of the video signal generated by the television camera 18, preferably having frame or field scanning frequency. For instance, in the case of an NTSC system, the frame frequency is 30 Hz, and the field frequency is 60 Hz. In such case, the frequency of the external synchronizing pulse P1 is either frame frequency of 30 Hz or a field frequency of 60 Hz.

Figures 2A, 2B, 2C:
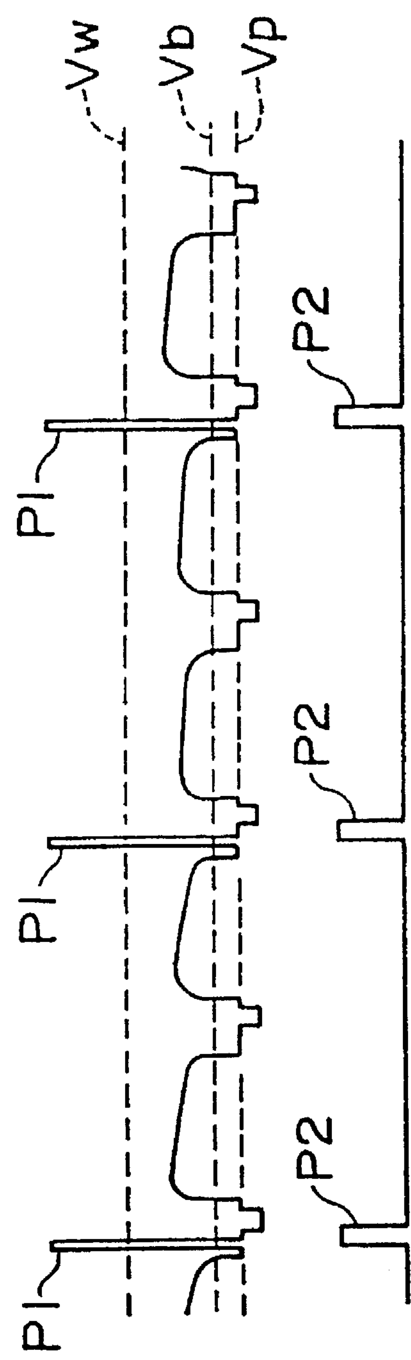
FIG. 2 (A–C) shows waveforms of a signal transmitted by the apparatus of FIG. 1.

As shown in FIG. 2(A), the time the external synchronizing signal P1 is generated adjoining the vertical synchronizing pulse, occurring during the vertical blanking period of the video signal transmitted from the television camera 18. Thereby, the external synchronizing signal P1 can be propagated to the television camera 18 through the common transmission line 24 transmitting the video signal without affecting the video signal. The voltage level of the external synchronizing signal P1 is preferably made higher than the white level Vw of the video signal. However, the voltage level of the external synchronizing signal P1 may be lower than the black level Vb, preferably the pedestal level Vp of the video signal.

In the following description, a frame external synchronizing pulse having a voltage level higher than the white level of the video signal, in particular, a frame external synchronizing pulse corresponding to the phase of a second field is used as the external synchronizing signal P1.

In the illustrated embodiment, each television camera 18 is a television camera operated in synchronization with the external synchronizing signal P1. For such a television camera, a well known television camera may be used synchronized with an external synchronizing signal having a voltage level higher than the white level (or lower than the black level) of the video signal, as disclosed in U.S. Pat. No. 4,603,352.

Each of the television cameras 18 or the transmitting means 12 is allotted an identification number for generating respectively an identification code made of numbers such as 1, 2, 3 . . . n, for injecting the identification code into the video signal during the vertical blanking period.

Each of the television cameras 18 or the transmitting means 12 includes a circuit for generating code signals corresponding to the identification code, and a circuit for generating a composite signal wherein the code signals are injected into the video signal. Such an apparatus is disclosed in U.S. Pat. No. 4,943,864, the content of which are incorporated herein by reference; therefore, each of the information signals received by each of the receiver circuit 32 incorporates identification code.

Figure 3:
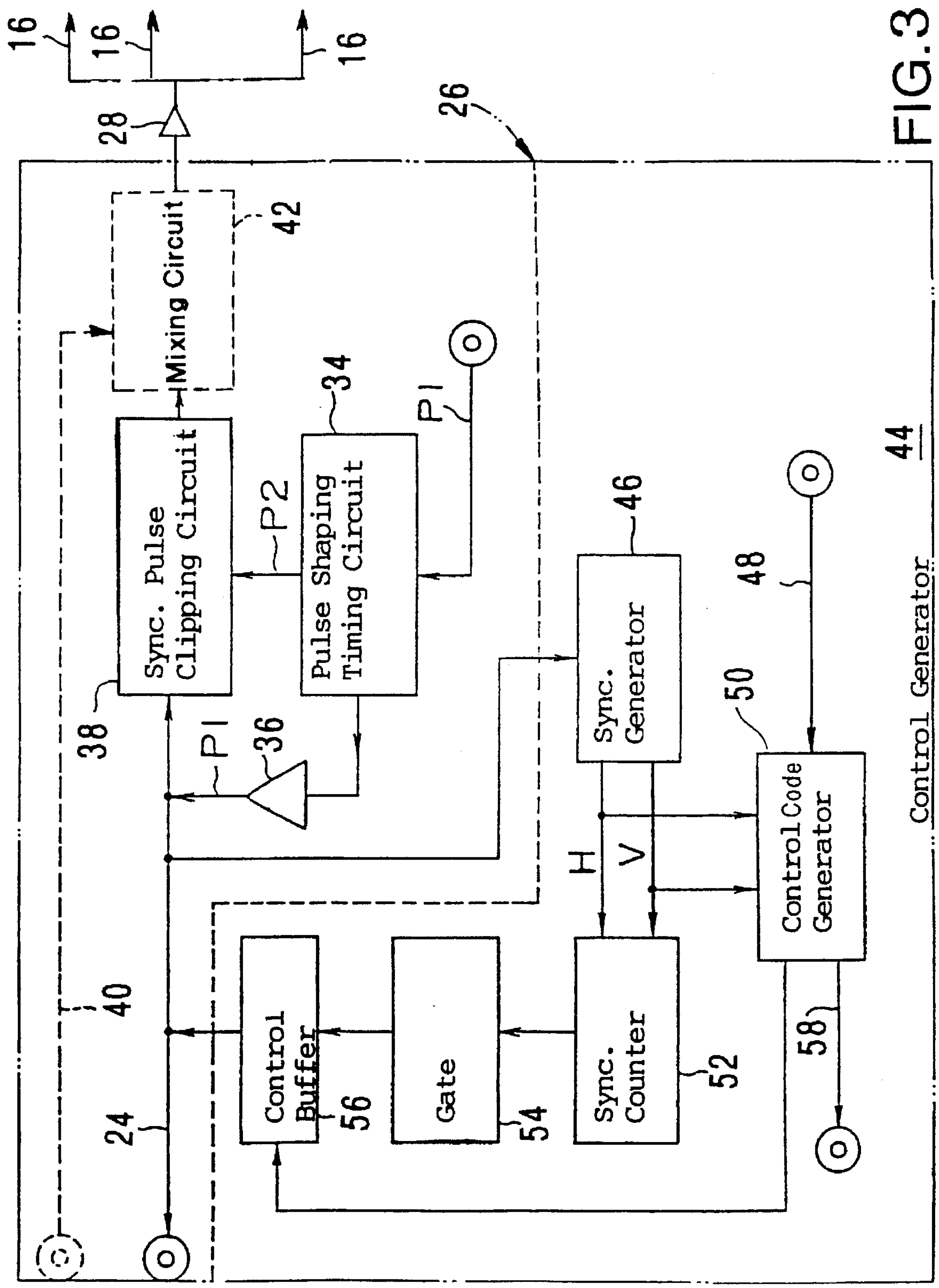
FIG. 3 is a block diagram of an electric circuit showing a transmitting apparatus of a preferred embodiment of the apparatus shown in FIG. 1.

As shown in FIG. 3, each transmission circuit 26 includes a pulse shaping timing circuit 34 for outputting a pulse signal P2 shown in FIG. 2(B) synchronized with the external synchronizing signal P1 fed from the external synchronizing signal generation circuit 20 shown in FIG. 1. The pulse shaping timing circuit 34 outputs both the pulse signal P2 and the external synchronizing signal P1. An external synchronizing signal injection circuit 36 receives the pulse signal P1 fed from the pulse shaping timing circuit 34 and injects the pulse signal P1 into the video signal transmission line 24. A synchronizing pulse clipping circuit 38 is provided for clipping the synchronizing pulse P1 from a signal fed from the video signal transmission line 24 and passing through the synchronizing pulse clipping circuit 38, by using the timing signal P2 to clip the pulse P1 and feed a video signal containing no synchronizing pulse P1 to the driver 28.

The synchronizing pulse clipping circuit 38 is fed with the signal shown in FIG. 2(A) from the video signal transmission line 24 and the timing signal P2 shown in FIG. 2(B) from the pulse shaping timing circuit 34. The signal P2 activates the clipping circuit for the duration of P2, thereby the clipping circuit 38 clips the entire signal portion of the signal fed to its input terminal above the black level Vb of the video signal during the period of signal P2. Since the duration of P2 covers the period of the external synchronizing pulse P1 the external synchronizing signal P1 is removed by the clipping circuit 38 from the composite video signal transmitted to the receiving apparatus 14, as shown in FIG. 2(C).

Accordingly, even though the external synchronizing signal P1 is present in the video signal fed from the television camera 18 through the transmission line 24 it is removed by the clipping circuit 38; therefore, the external synchronizing signal P1 injected into the video signal transmission line 24 will synchronize the television camera 18 and will not cause any receiving error by the receiving apparatuses 14.

When the television camera 18 also generates an audio signal, the audio signal can be fed to the driver 28 through the transmitting circuit 26 and transmitted together with the video signal to the receiving apparatus 14.

When the audio signal is connected separately to the transmitting apparatus 12 it is fed through the transmission line 40 to a mixing circuit 42 for mixing or injecting the audio signal into the video signal for feeding it to the driver 28. When the audio signal is mixed with the video signal inside the television camera 18 the audio signal is fed to the transmitting apparatus 12 through the video signal transmission line 24. Since the video signal and the audio signal are already mixed together the mixing circuit 42 is not necessary. In this case, the output signal of the clipping circuit 38 may be fed to the driver 28 directly.

Each transmission circuit 26 includes a control generator 44 for generating a control signal for controlling the corresponding television camera 18. The control generator 44 includes a synchronizing separator circuit 46 for separating the horizontal and vertical synchronizing signals H and V from the video signal transmitted through the video signal transmission line 24. Also included is a control signal generator circuit 50 for outputting a control signal for operating the corresponding television camera 18 during predetermined timing suing the separated synchronizing signals H and V and the control command fed from the controller 22 shown in FIG. 1 through a control line 48. A counter 52 is provided for counting the number of horizontal scanning lines fed from the sync separator 46 during each frame or field. The control signal generator 44 also includes a gate circuit 54 for generating a gate signal when the counted value of the counter 52 is a predetermined value, and a buffer circuit 56 controlled by the gate signal for injecting the control signal fed from the control signal generator circuit 50 into the video signal transmission line 24.

In the preferred embodiment of the present invention, the injector circuit may include a mixer circuit wherein the code signals are mixed and injected into the composite video signal. Such a mixer circuit is disclosed in U.S. Pat. No. 4,989,085, the contents of which are incorporated herein by reference, or it can be an injection circuit disclosed in U.S. Pat. No. 5.335.014 the contents of which are incorporated herein by reference.

The control command fed to each transmitter circuit 26 through control line 48 from the controller 22 of FIG. 1 may include a control code for switching a power supply on-off, wiper on-off, tilting up-down, panning left-right and zooming tele-wide or the like, or a start or stop command of the transmission of a video signal. The control signal combines the control code corresponding to the control command and the identification code respectively allotted to each of the television cameras 18. In addition, the control signal is injected into the video signal transmission line 24 by the buffer circuit 56 of FIG. 3 at a predetermined time within the vertical blanking period. The injection timing of the control signal into the signal transmission line 24 is different from the injection timing of the external synchronizing signal into the video signal transmission line 24.

The control line 48 may be connected individually to each television camera 18 via each transmitting apparatus individually, or connected in common to the plurality of transmitting apparatuses. When the control line 48 is commonly connected to the plurality of transmitting apparatuses each of the transmitting apparatuses includes an identification code extractor for activating the control generator 50 only when the identification code incorporated in the control code is identical to the identification code of the corresponding television camera connected to the transmitting apparatus, using identical code extraction circuit shown in FIG. 6. Further, the control command can be directly transmitted from the controller 22 to each television camera 18.

It is apparent from the above description that both the external synchronizing signal and the control signal can be transmitted from each transmitting apparatus to the corresponding television camera through the respective video signal transmission line 24.

However, the control signal composed of the control code and the identification code can be transmitted to the television camera 18 through a separate control transmission line 58 instead of the video signal transmission line 24. A twisted pair transmission line or optical fiber transmission line can be used for transmitting the control signal directly to the television camera 18. Similarly, the external synchronizing signal P1 may be transmitted to the television camera through a separate transmission line, using coax cable, twisted pair or optical fiber transmission lines. For receiving separate audio signals a separate transmission line 40 using twisted pair or shielded cable can be used.

Figure 4:
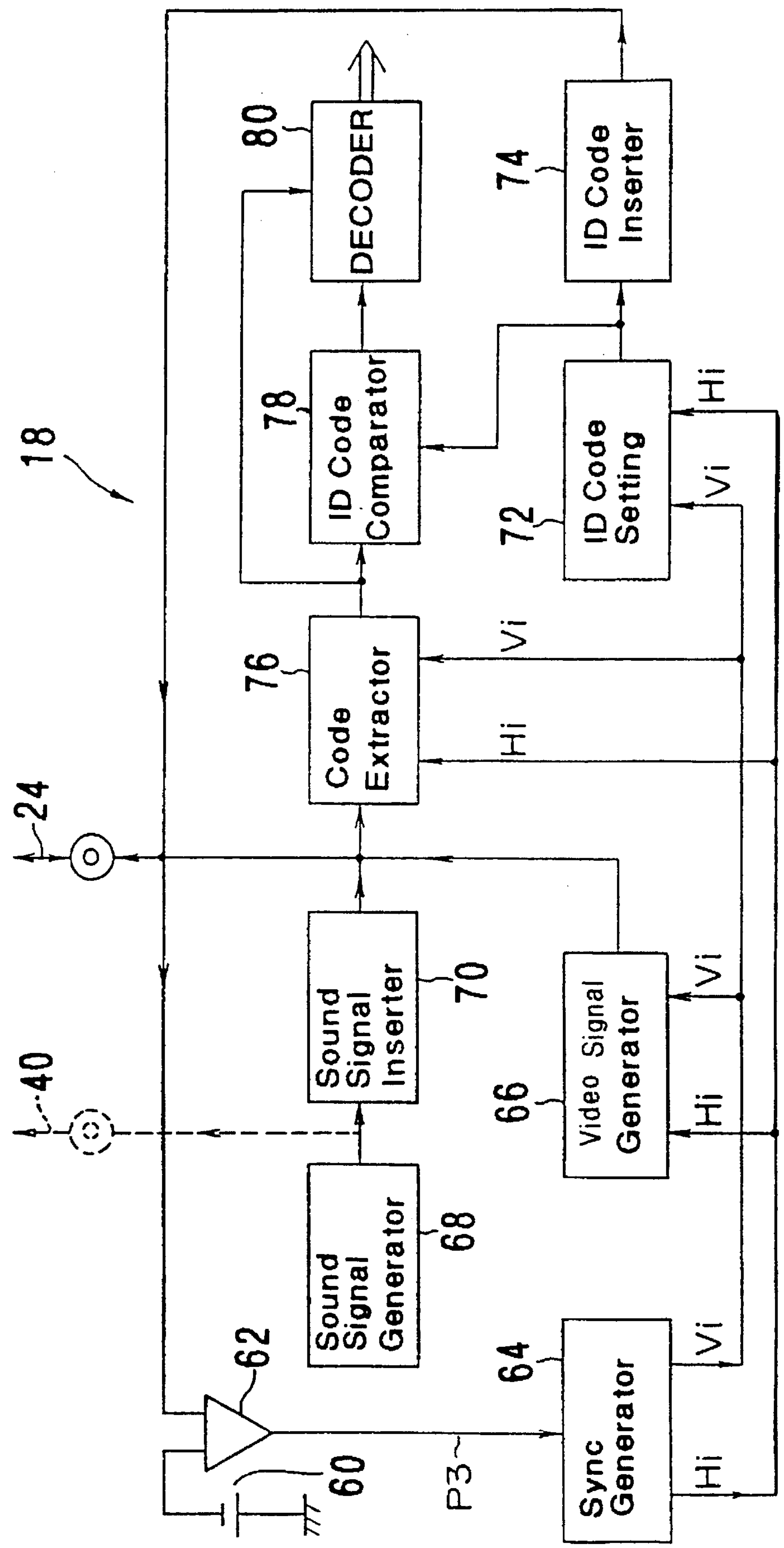
FIG. 4 is a block diagram of an electric circuit showing a television camera of a preferred embodiment of the apparatus shown in FIG. 1.

As shown in FIG. 4, each television camera 18 includes a reference voltage source 60 which feeds a reference voltage to the voltage comparator 62 for separating the external sync pulse by comparing the voltage level of the external synchronizing signal P1 transmitted from the transmitting apparatus through the video signal transmission line 24 with the reference voltage and generating a pulse signal P3 when P1 level is same or larger than the reference voltage. An internal synchronizing signal generation circuit 64 generates internal synchronizing signals Hi and Vi synchronized with the pulse signal P3 fed from the voltage comparator 62, a video signal generation circuit 66 generates video signal synchronized with the internal synchronizing signals Hi and Vi for feeding it to the video signal transmission line 24, an audio signal generation circuit 68 generates audio signal along with the video signal and an audio signal injection circuit 70 injects the audio signal into the transmission line 24.

When transmitting an audio signal through the separate transmission line 40 instead of injecting the audio signal into the video signal transmission line 24, the audio signal injection circuit 70 is not required.

As shown in FIG. 4, each television camera 18 further includes an identification code setting circuit 72 for generating an identification code respectively allotted to the television camera 18 at a predetermined time within the vertical blanking period of the composite video signal on the basis of the internal synchronizing signals Hi and Vi, and an identification code injection circuit 74 for injecting the identification code fed from the setting circuit 72 into the video signal transmission line 24.

The timing of the identification code injection into the video signal transmission line 24 by the injection circuit 74 is different from the timing the control signal is injected into the video signal transmission line 24 by the transmitting apparatus 12 shown in FIG. 3. The control signal is injected into the video signal transmission line 24 by the transmitting apparatus 12 during one or more predetermined horizontal scanning lines during the vertical blanking period of the composite video signal, while the identification code is injected into the video signal transmission line 24 by the television camera 18 during one or more predetermined different horizontal scanning lines during same or another vertical blanking period of the composite video signal.

Identification code signals are shown in FIG. 5 (A–C). The identification code signal is a binary code or a bar code signal having two or more levels composed of a high level or white, which is the maximum or highest level of the picture signal in the videos signals, a low level or black, which is the lowest level of the picture signal, and a median level or gray, which is the medium level of a picture signals in the video signal generated by the television cameras 18 as shown in FIG. 6A; the identification code may be a combination of pulse signal levels and varying pulse widths as shown in FIG. 6B.

Alternatively, the identification code signal may be either a sine-wave signal or a pulse signal having a frequency corresponding to the identification code, the sine-wave, or the pulse signal is generated during one or more horizontal scanning periods as shown in FIG. 6C, preferably, during the vertical blanking period.

The control signal generator circuit 50 shown in FIG. 3 generates the control code signals in electronic shaped signals similar to the identification code signal shown in FIG. 5 (A–C). However, different shaped electrical signals may be applied to the control code signal and the identification code signal, similarly, the identification code incorporated in the control signal does not have to be identical to the identification code generated by the identification setting circuit 72 of the television camera of FIG. 4. Any code commensurating with the allotted identification to each television camera can be used instead of an identical identification code.

In FIG. 4, each television camera 18 further includes a code extraction circuit 76 for extracting a control code and an identification code transmitted from the control signal generator circuit 50 shown in FIG. 3, an identification code comparing circuit 78 for comparing the extracted identification code with an identification code fed from the setting circuit 75 for feeding match signal to the decoder 80 when both codes correspond to each other, and a decoder 80 for decoding the control code fed from the code extraction circuit 76 and generating control commands corresponding to the decoded control code only when the decoder 80 is fed with match signal from the identification code comparator 78.

Figure 6:
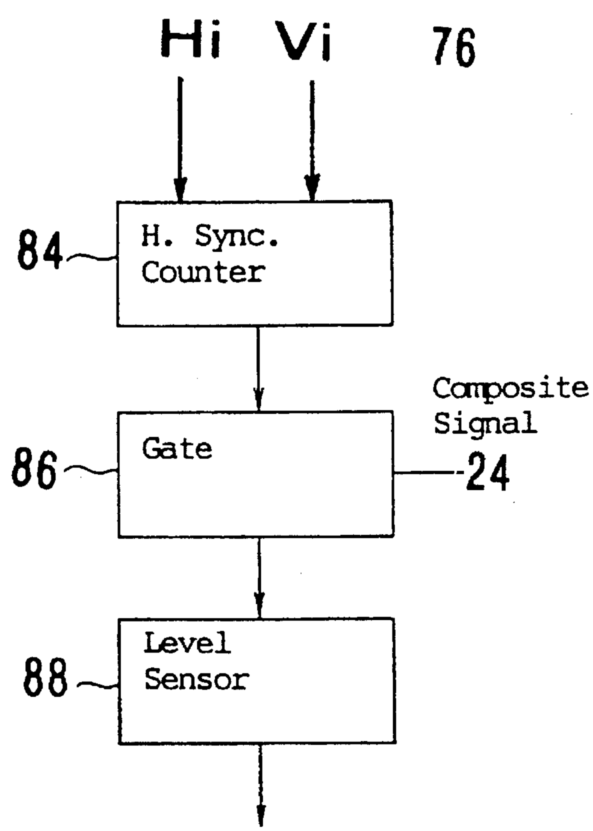
FIG. 6 and 6A is a block diagram of a code extraction circuit of a preferred embodiment of the television camera shown in FIG. 4.

The code extraction circuit 76 of FIG. 6 incorporates a counter 84 for counting the number of horizontal synchronizing pulses during every field or frame of the video signal, a gate circuit 86 connected to the output of the counter 84 for outputting the video signal fed from transmission line 24 when the counted value of the counter 84 is a predetermined value, a level sensor 80 for sensing a signal level or for detecting the envelop of the signal fed from the gate circuit 88 to reproduce and output the code signal extracted from the video signal fed from transmission line 24.

The code comparing circuit 78 generates a match signal when the extracted code fed from the extraction circuit 76 corresponds or commensurate to the code set in the setting circuit 72, and generates a mismatch signal when the extracted code fed from the extraction circuit 76 does not correspond or commensurate to the code set in the setting circuit 72.

Figures 5A, 5B, 5C:
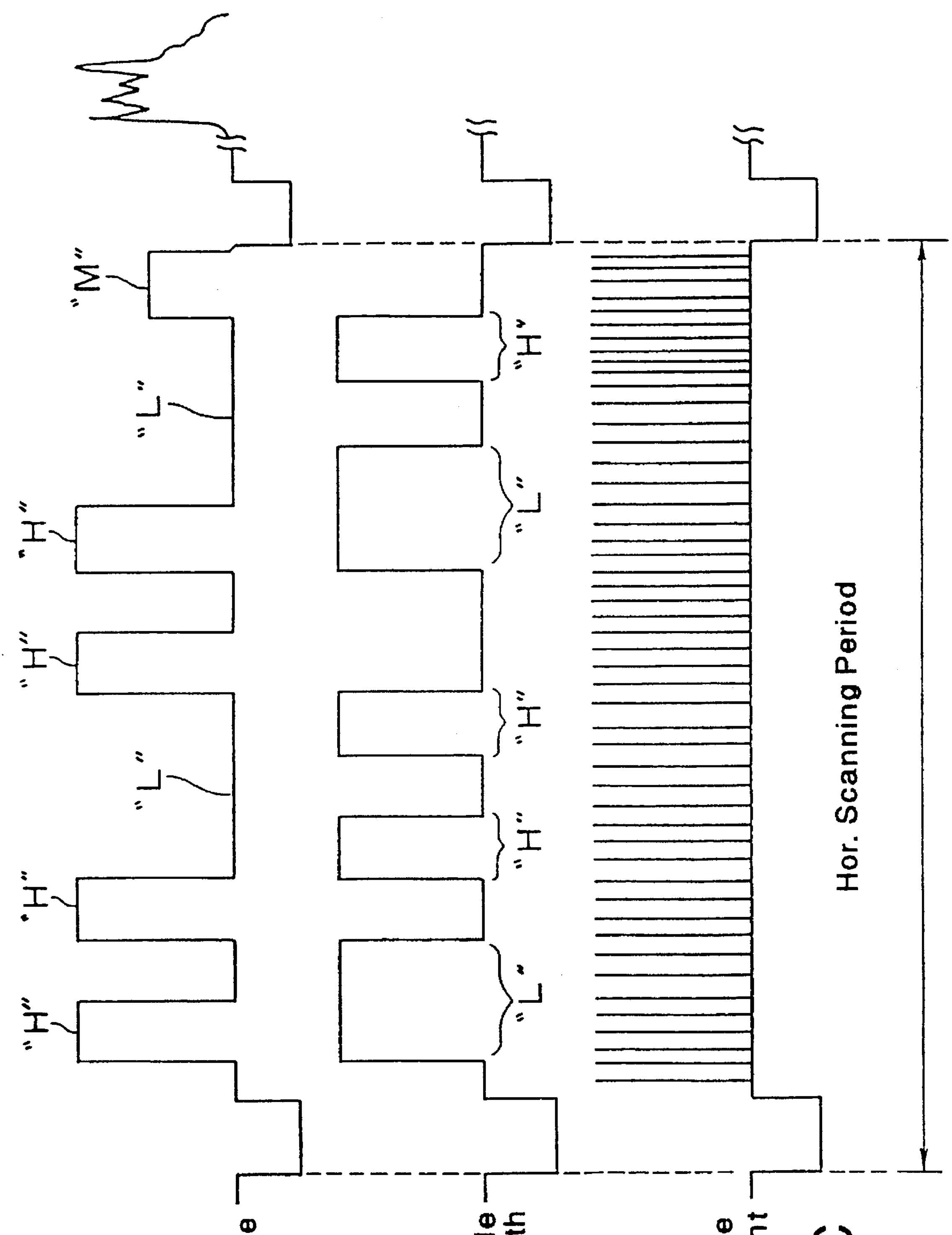
FIG. 5 (A–C) shows waveforms of an identification code signal.
Figure 6A:
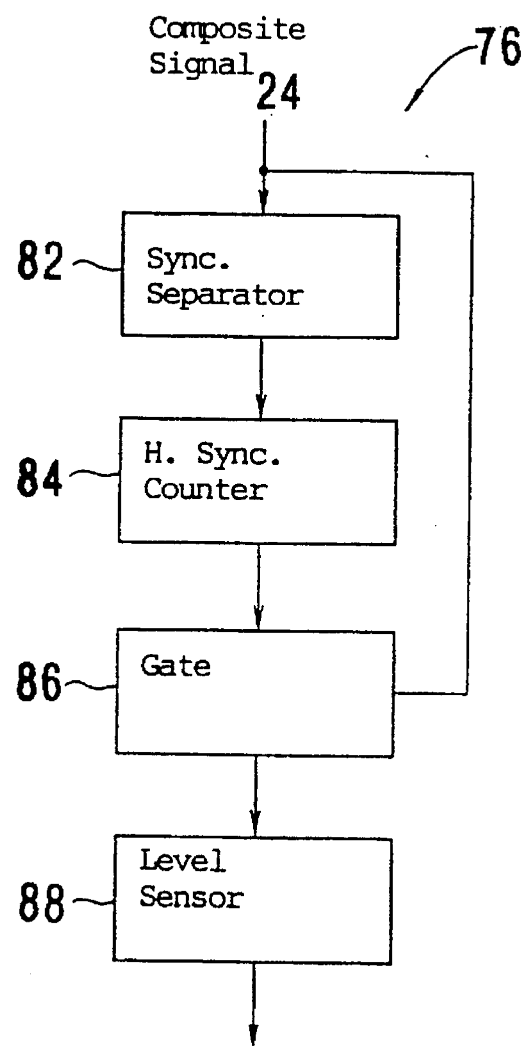

Referring to FIG. 6A, when using a control code and an identification code having the signal wave form shown in FIG. 5(A) or 5(B), the extraction circuit 76 can be also composed of a synchronizing signal separator circuit 82 for separating the horizontal and the vertical synchronizing signals from a composite signal transmitted from the television camera, a counter 84 for counting the number of horizontal scanning lines of the television camera for each field or frame, a gate circuit 6 for outputting the composite signal transmitted from the television camera only during a period of time when a counted value of the counter 84 is equal to a predetermined value, and a level sensor 88 for reproducing a code signal by sensing the level or the envelope of the output signal of the gate circuit 86.

When using a control code and an identification code having signal waveform shown in FIG. 5C the level sensor circuit may incorporate frequency or pulse counter for counting the frequency or the number of pulses fed from the gate circuit 86.

The decoder 80 of FIG. 4 feeds the different control commands to different drivers for operating the television camera by commanding the power supply on-off, wiper on-off, tilting up-down, panning left-right zooming tele-wide, focus near-far, iris open-close or the like, or commanding the start or the stop of the transmission of a video signal.

It has been apparent from the above description that a multiplex signal composed of the video signal consisting of the composite video signal, along with audio signal and the identification code respectively allotted to each television camera is transmitted from each television camera 18 to the corresponding transmitting apparatus 12 through the video signal transmission line 24.

Figure 7:
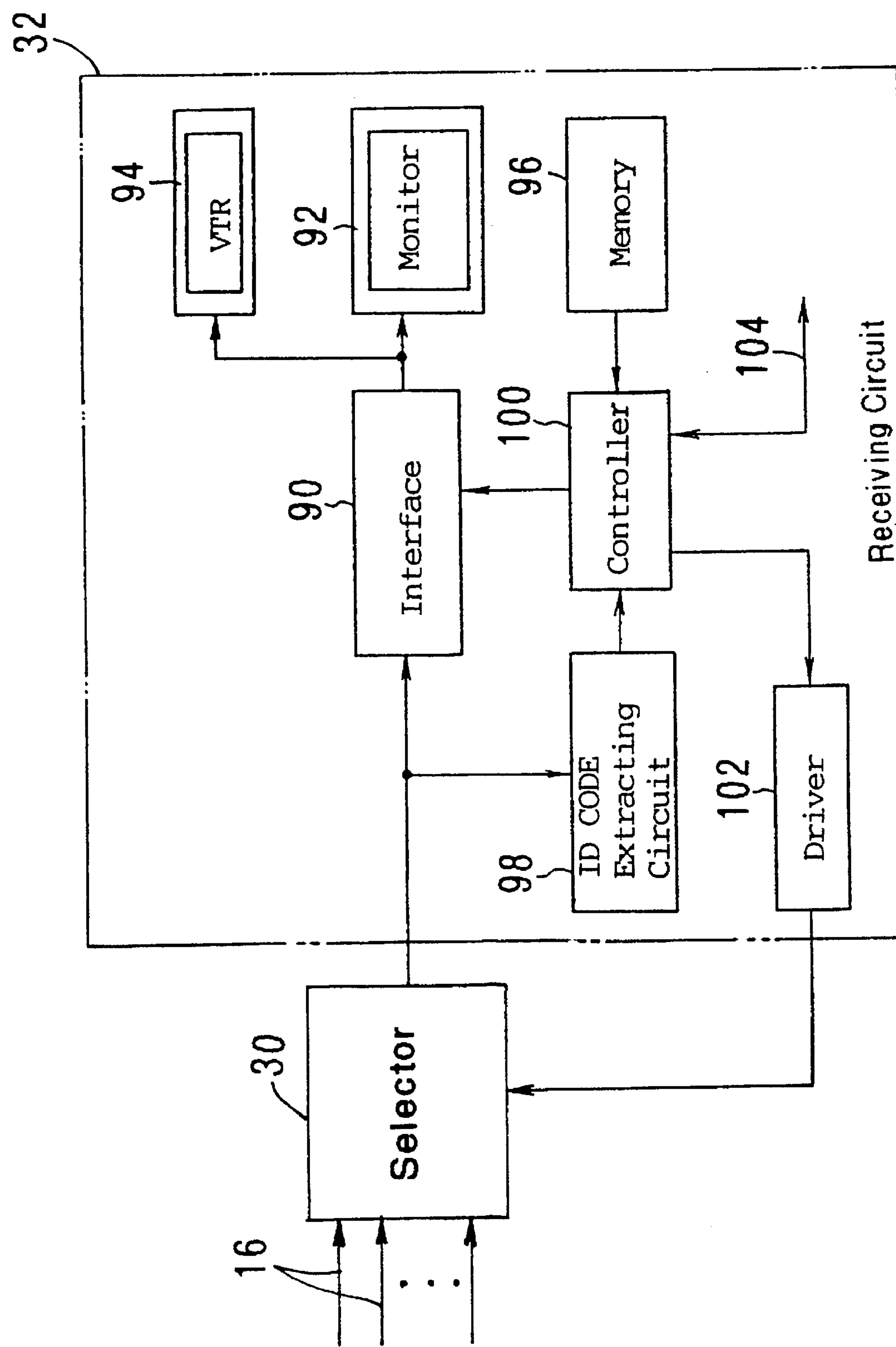
FIG. 7 is a block diagram of an electric circuit showing a receiving apparatus of a preferred embodiment of the apparatus shown in FIG. 1.

As shown in FIG. 7, each receiver circuit 32 includes an interface 90 for receiving an information signal transmitted through the information transmission line 16 selected by the selection circuit 30. The interface 90 feeds the received information signal to a monitor 92 and a video recorder 94.

The monitor 92 is a television receiver for displaying an image corresponding to the video signal included in the information signal transmitted from the transmitting apparatus, and for reproducing sound in accordance with the corresponding audio signal included in the information signal. The video recorder 94 is a video tape recorder for recording and playing back the video signal and the audio signal transmitted from the transmitting apparatus.

Each receiving circuit 32 further includes a memory 96 for storing data for identifying the television camera connected to the monitor 92 and data identifying all other respective television cameras 18 connected to all the respective transmitting apparatuses 12, an identification code extraction circuit 98 for extracting an identification code from the information signal, a controller 100 for identifying the television camera connected to the monitor 92 by reading out data from the memory 96 on the basis of the code extracted from the information signal and for feeding the identifying data to the interface 90 for superimposing an identification text, numeric or graphic, for display on the monitor screen 92 along with the picture generated by the video signal. Similarly, the text, numeric or graphic display can be recorded by the video tape recorder 94 along with the video signal generated by the television camera 18.

The identifying data may be a graphic illustration data for displaying an installation location, an identification number data, a text description data related to the television camera or its location or the like.

The code extraction circuit 98 is similar to the extraction circuit shown in FIG. 6A which includes a synchronizing signal separator circuit 82 for separating the horizontal and vertical synchronizing signals from a composite signal transmitted from the television camera, a counter 84 for counting the number of horizontal scanning lines of the television camera for each field or frame, a gate circuit 86 for outputting the composite signal transmitted from the television camera only during a period of time when a counted value of the encounter 84 is equal to a predetermined value, and a level sensor 88 for reproducing a code signal by sensing the level or the envelope of the output signal of the gate circuit 86.

The extracted identification code fed from the extraction circuit 98 is applied by the controller 100 for reading out the stored data from the memory 96. The data fed from memory 96 via the controller 100 is superimposed onto the video signal in the interface circuit 90 for displaying a numeric, text or graphics onto the monitor screen 92, enabling an operator to recognize the location or position being observed or monitored by the television camera 18. The controller 100 also controls the superimposed display position and switching the display on and off. Such an apparatus for superimposing numeric text or graphics is disclosed in U.S. Pat. No. 4.943.864 the contents of which are incorporated herein by reference.

The controller 100 transmits and receives information between the controller 100 and the controller 22 shown in FIG. 1 through an internal control line 104. A signal fed from the control circuit 22 to the controller 100 also contains switching on or switching-over information for selecting an information transmission line 16 and an external synchronizing signal for controlling the timing of the switching of the information transmission line.

The controller 100 feeds a drive command to the driver 102 for driving the information transmission line selection synchronized with the external synchronizing signal. Therefore, the driver 102 drives the selector circuit 30 and switches on any of the information transmission line 16 or switches over from one information transmission line 16 to another in accordance to the drive command and in synchronization with the external synchronization signal.

As a result, the mixed video and the audio signals generated by the television camera selected through the controller 22 are fed to monitor 92 for reproducing a picture display and a sound, along with recording of the video and audio signals onto the video tape recorder 94. Therefore, the operator can select for monitoring and recording any of the television cameras through any of the controllers 22 of the respective receiving apparatuses 14. The operator can further superimpose any numeric, text or graphics for the displayed signal into the displayed picture reproduced from the video signal.

Further, when the superimposed numeric, text or graphics obstruct the observed picture, the operator can reposition the superimposed display or switch off the superimposed display from the monitor screen.

According to the information signal selecting apparatus 10 of FIG. 1, the transmitting apparatuses and the receiving apparatuses can be connected together by a simple apparatus in an arbitrary combination with each other, whereby, one, two or any arbitrary transmitting apparatuses can be connected to a plurality of arbitrary receiving apparatus.

Further, since the switching on or the switch-over timing of the information transmission line in the selection circuit 30 is synchronized by the external synchronizing signal fed from the controller 100 together with the transmission line selection information, the selection circuit 30 switches over the information transmission synchronously with the video signal. As a result, the reproduced picture images during and immediately after the switching on or the switching over from one information transmission line to another are not disturbed.

When the television camera is synchronized by the well known horizontal and vertical synchronizing signals, or by the well known composite synchronizing signal, or by the well known horizontal and vertical drive signals, a generation circuit for the horizontal and vertical synchronizing signals, the composite synchronizing signal or the horizontal and vertical drive signals can be arranged instead of the external synchronizing signal generator circuit 20 of FIG. 1. Accordingly, the external synchronizing signal injection circuit 36 and the clipping circuit 38 shown in FIG. 3 will not be required.

Instead of providing the external synchronizing signal injection circuit 36 and the clipping circuit 38 in the transmitting apparatus 12, the external synchronizing signal P1 can be directly fed through a separate transmission line to the level comparing circuit 62 in FIG. 4, of the television camera 18. When the television camera is not provided with any level comparing circuit, a signal corresponding to the pulse signal P3 can be fed directly as a vertical external synchronizing signal to the internal synchronizing signal generator circuit 64 of the television camera 18 through a separate transmission line. In the latter case, the transmitting apparatus 12 does not need the external synchronizing signal injection circuit 36 and the clipping circuit 38 shown in FIG. 3.

The mixing circuit 42 of the transmission circuit 26 can be a circuit for modulating a carrier wave by an audio signal, and for outputting a composite video signal mixed with the modulated audio. In this case, the receiving circuit 32 includes a circuit for demodulating the audio signal.

Further, the mixing circuit 42 can be provided with a circuit for compressing a time base of an audio signal at such a rate that a time corresponding to one vertical scanning period of a video signal becomes equal to a time corresponding to one or more horizontal scanning period of the video signal, and for injecting the compressed audio signal during the vertical blanking period of the video signal. In this case, the receiving circuit 32 includes a circuit for extracting the compressed audio signal from the video signal and for decompressing the time base of the extracted audio signal.

Other circuits can be used instead of the mixing circuit 42 described above. The audio signal injection circuit 70 of the television camera 18 shown in FIG. 4, can also be a circuit similar to the mixing circuit 42 of the transmission circuit 26 shown in FIG. 3.

The control signal for controlling the television camera 18 can be fed from a single controller to any arbitrary number of transmitting apparatuses, instead of to all the transmitting apparatuses. Otherwise, a controller may be respectively provided for each transmitting apparatus to feed the control signal from each controller individually to each of the transmitting apparatus 12. In addition, the control signal may be transmitted from each receiving apparatus to each transmitting apparatus through the information transmission lines 16.

Further, instead of having a single controller for each individual receiving apparatus, two or any arbitrary number of receiving apparatuses can be controlled by a single controller. Otherwise, a controller may be respectively provided for all the receiving apparatus to control individually each receiving apparatus.

Figure 8:
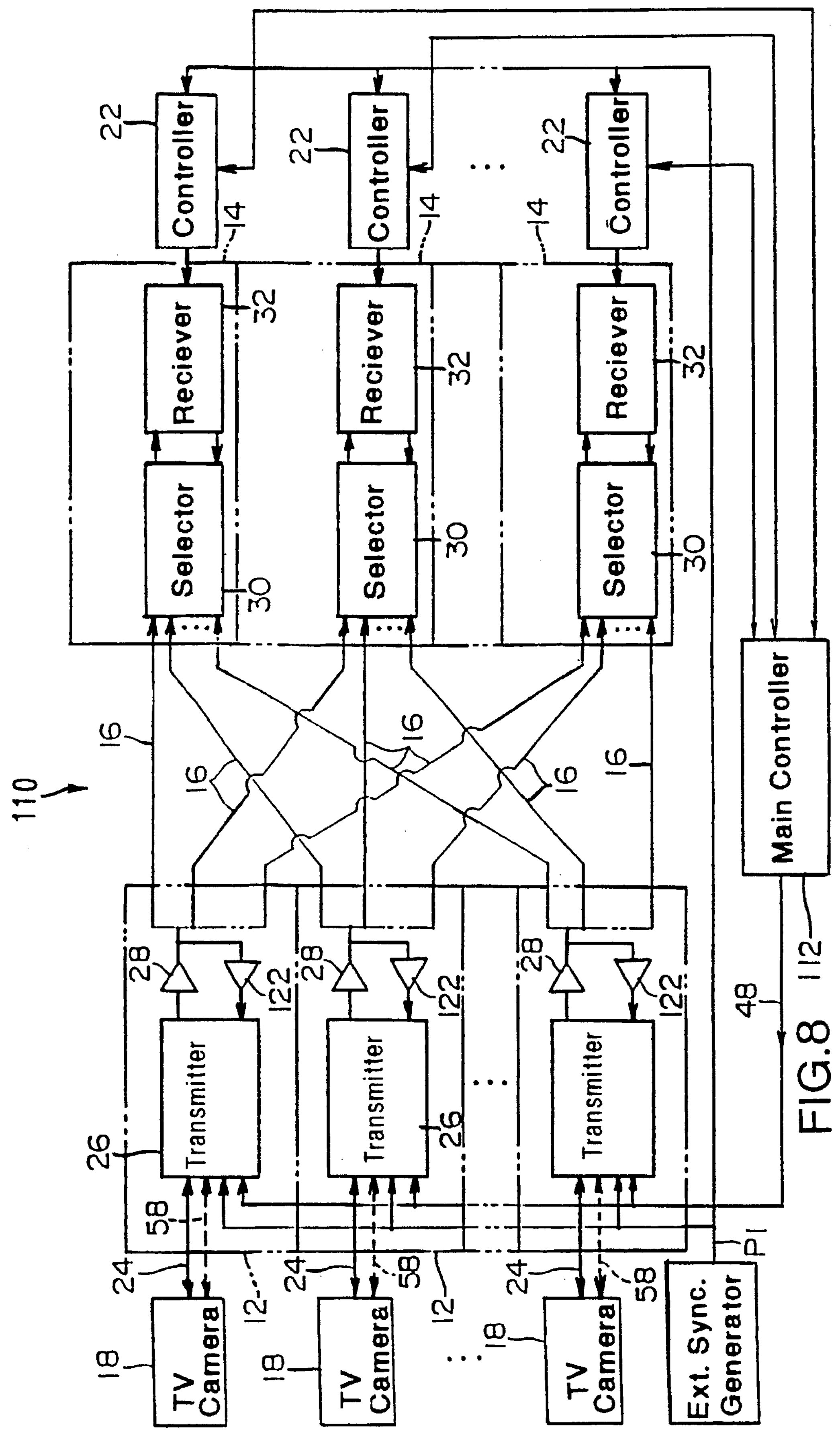
FIG. 8 is a block diagram of an apparatus for selecting information signals of another preferred embodiment of the present invention.

An information signal selecting apparatus 110 shown in FIG. 8 comprises an individual controller 22 respectively provided for each receiving apparatus 14, wherein each receiving apparatus 14 along with each individual selection circuit 30 of the receiving apparatus 14 is controlled by the individual controller 22, a main controller 112 for controlling the state of selection of each individual controller 22 and coordinates the state of the receiving apparatuses 14, such as preventing conflicting selection and control, or prohibiting wrong selection or the like by any of the receiving apparatuses 14.

In addition, the main controller 112 may feed a control data to each controller 22, such control data may consist of data prohibiting the selection of one or more information transmission lines or the like.

When an operator of controller 22 selects a prohibited information transmission line the controller 22 feeds the selection data to the master controller 112 and the master controller overrides the controller 22 selection and cancel the selection through the internal control line 104 by feeding a prohibiting command to controller 100 of FIG. 7. When an operator selects a non prohibited information transmission line the controller 22 feeds both the received information transmission line selection data and the external synchronizing signal P1, fed from the external synchronizing signal generation circuit 20, to the receiver circuit 32 of the corresponding receiving apparatus 14. The information transmission line selection data fed to the controller 100 as shown in FIG. 7 is synchronized to the external synchronizing signal, thereby, the controller 100 feeds a drive command corresponding to the received data pertaining to the information transmission line selection information to the driver 102 synchronized with the external synchronizing signal, and the driver 102 drives synchronously the selection circuit 30 to select the information transmission line 16 corresponding to the drive command.

The controller 22 of the information signal selecting apparatus 110 shown in FIG. 8 can replace the controller 100 of the receiving circuit 32 shown in FIG. 7. Furthermore, the external synchronizing signal can be fed directly to the controller 22 through the main controller 112.

Figure 9:
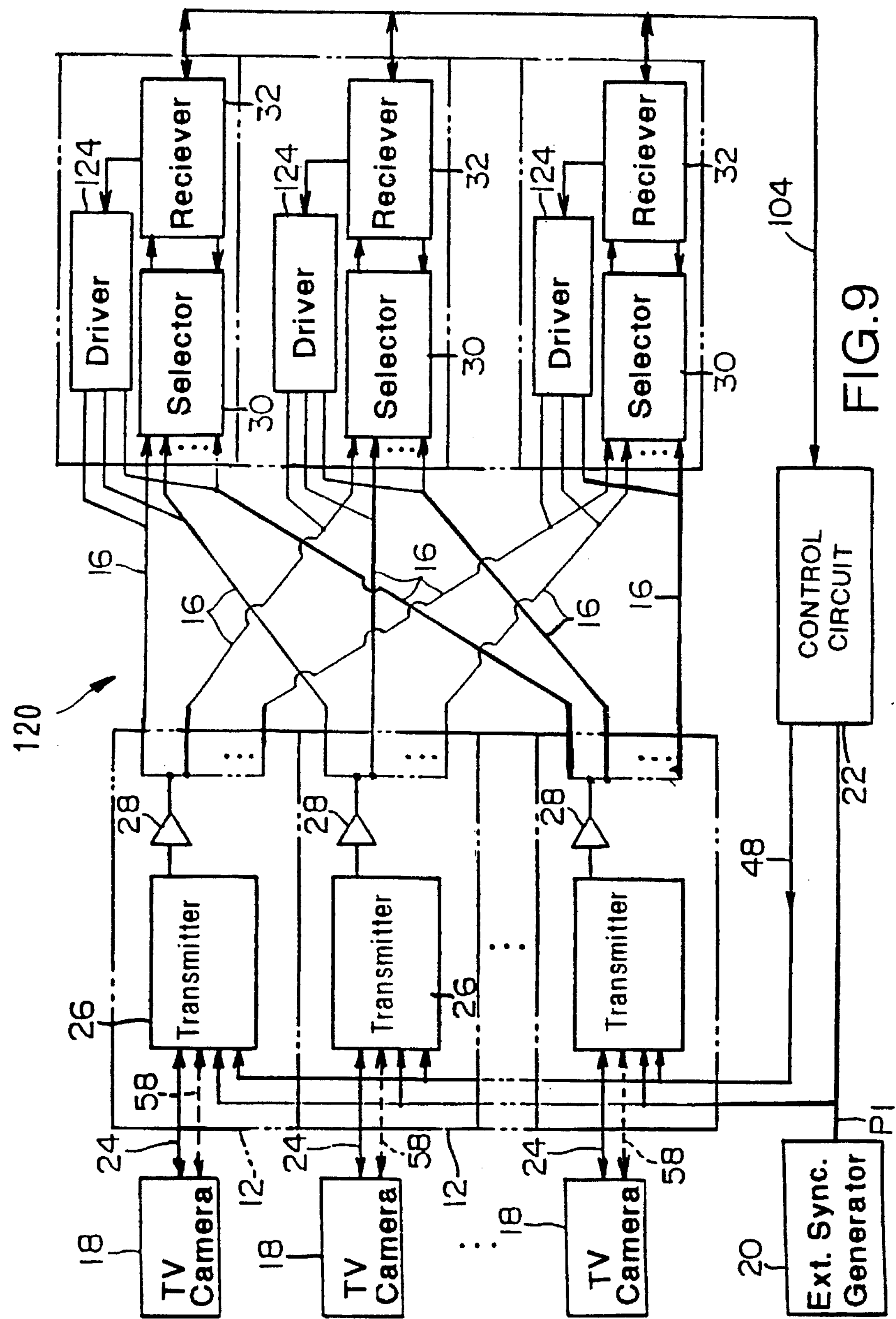
FIG. 9 is a block diagram of an apparatus for selecting information signals of a further preferred embodiment of the present invention.

An information signal selecting apparatus 120 shown in FIG. 9 transmits a control signal from each receiving apparatus 14 to the transmitting apparatus 12 through the information transmission line 16. Therefore, each transmitting apparatus 12 includes an interface 122 for receiving the control signal, and each receiving apparatus 14 includes a drive circuit 124 for transmitting the control signal.

Figure 10:
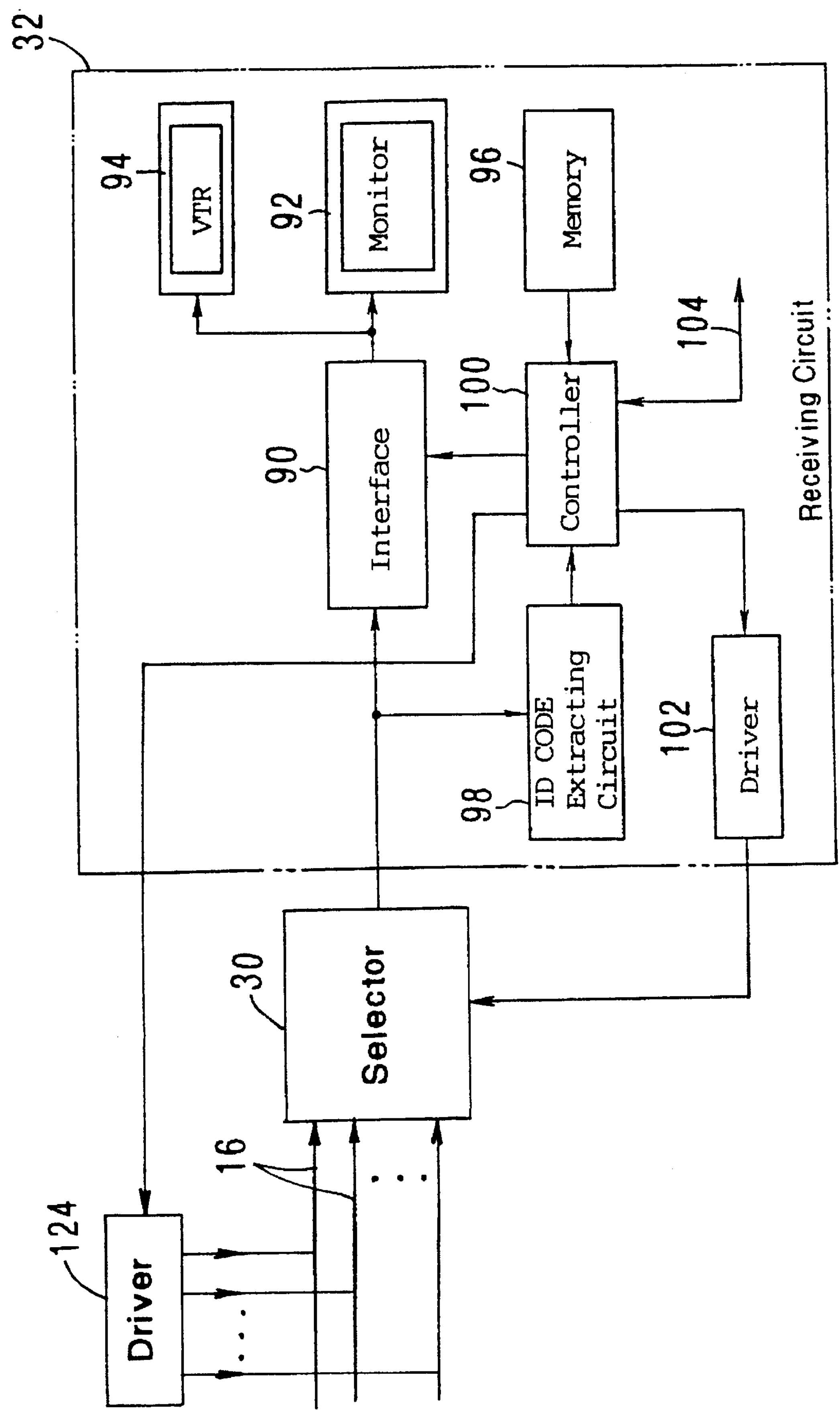
FIG. 10 is a block diagram of an electric circuit showing a receiving apparatus of a preferred embodiment of the apparatus shown in FIG. 9.

As shown in FIG. 9, the controller 100 of FIG. 10, of each receiving apparatus 14 extracts the control signal transmitted from the controller 22 and feeds the extracted control signal to the drive circuit 124. When the controller 100 of FIG. 10 receives a command to transmit the control signal from the controller 22, the drive circuit 124 injects the control signal fed from the controller 100 into the selected information transmission line 16.

Each interface 122 extracts the control signal transmitted through the information transmission line 16 and feeds the extracted control signal to the control signal generation circuit 50 shown in FIG. 3. The controller 22 prevents the same television camera 18 from being driven by the control signals fed from a plurality of different receiving apparatuses 14, thereby preventing contradictory control signals from being fed to the same television camera.

Figure 11:
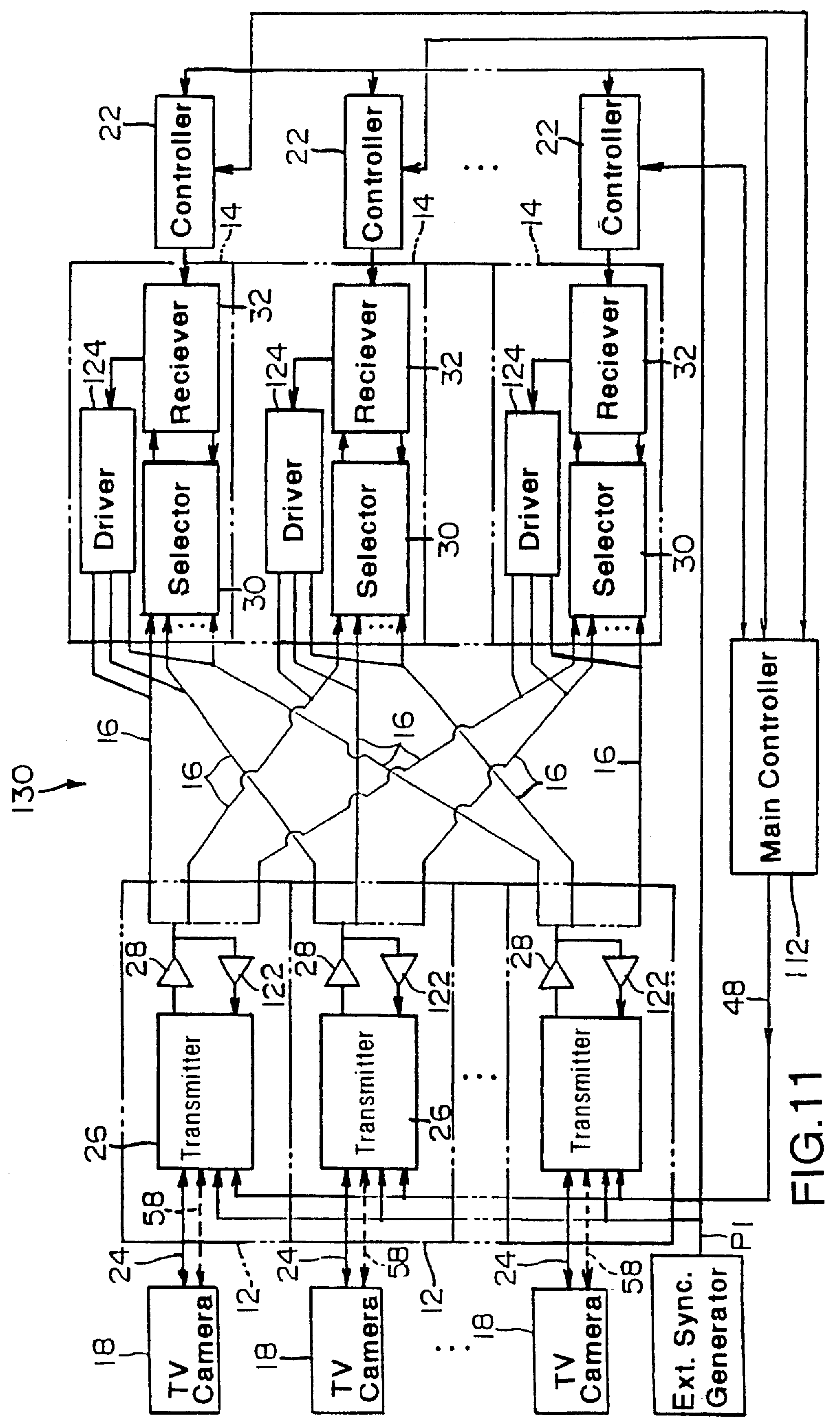
FIG. 11 is a block diagram of an apparatus for selecting information signals of still further preferred embodiment of the present invention.

An information signal selecting apparatus 130 shown in FIG. 11 combines the information signal selecting apparatus 110 shown in FIG. 8 and the information signal selecting apparatus 120 shown in FIG. 9. Therefore, the information signal selecting apparatus 130 comprises the main controller 112, the controller 22 respectively provided for each receiving apparatus 14, the interface 122 provided for each transmitting apparatus 12 and the drive circuit 124 respectively provided for each receiving apparatus 14. Each of these circuits operates in a similar manner to the corresponding one of the circuits shown in FIGS. 8 and 9.

Figure 12:
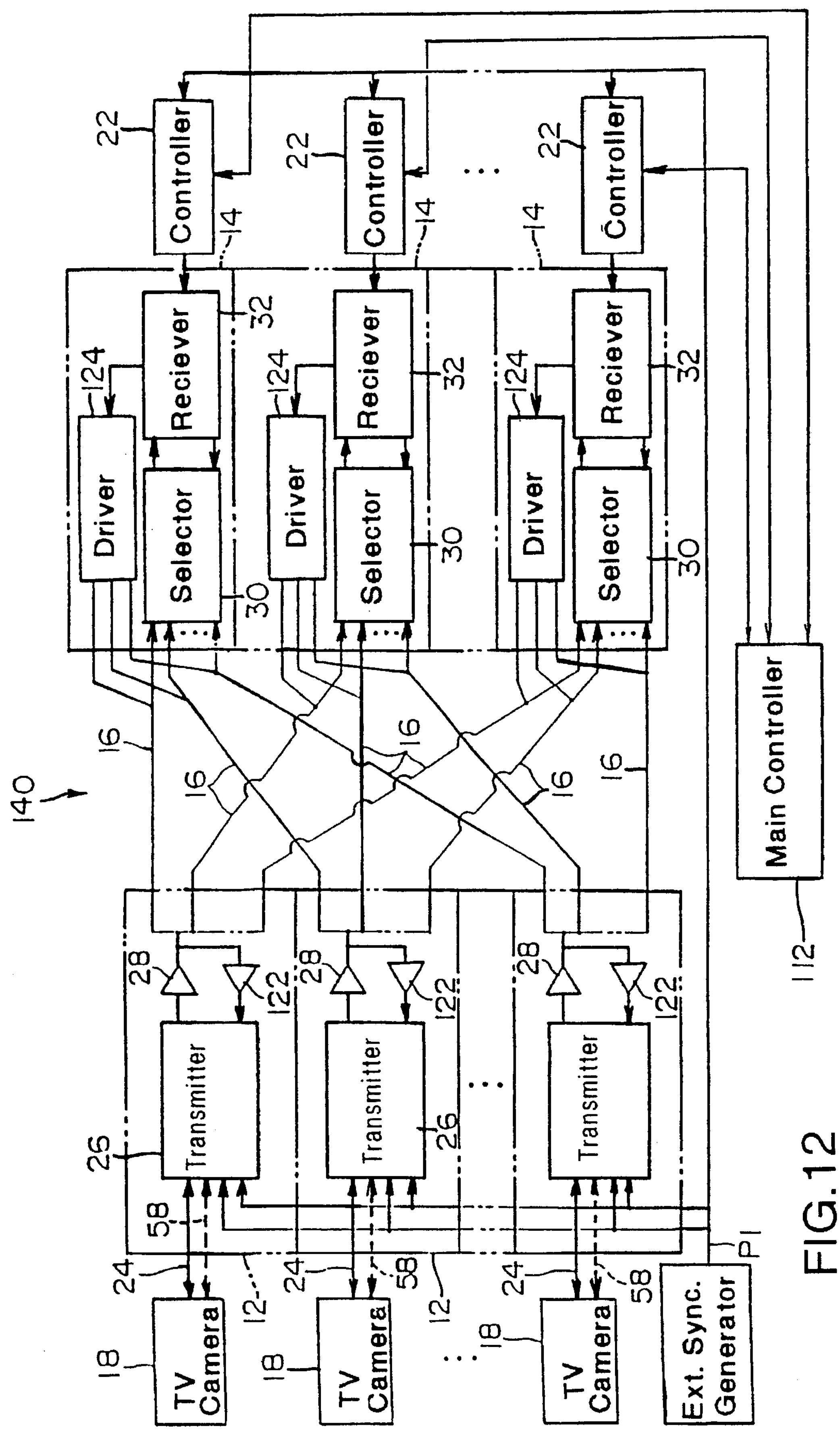
FIG. 12 is a block diagram of an apparatus for selecting information signals of yet further preferred embodiment of the present invention.

An information signal selecting apparatus 140 shown in FIG. 12 transmits a control signal only through the receiving apparatus 14 and the information transmission line 16 but not directly to the transmitting apparatus 12 as provided by the information signal selecting apparatus 130 shown in FIG. 11. In the information signal selecting apparatus 140, the main control circuit 112 receives current data of the selection in process from each controller 22, and feed the signal for controlling the video generating means to the controller 22 of the receiving apparatus, the controller 22 transfers the control signal through the selected information transmission line 16 connected to the transmitting apparatus 12 in a similar manner to the information selecting apparatus 130 of FIG. 11.

In the embodiment described above, there are as many transmitting apparatuses 12 as there are receiving apparatuses 14. However, the number of transmitting apparatuses 12 may be different from that of receiving apparatuses 14. Further for an information generating apparatus for generating information signals any reproduction signal generating apparatus or other apparatus, may be used instead of the video signal generating apparatus composed of the television camera 18.

The present invention can be applied not only to the information signal selecting apparatus used in a monitoring system but also to any other information transmitting apparatuses.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. An apparatus for selecting information signals, comprising:

a plurality of transmitting means each adapted to process an electrical information signal;

a plurality of receiving means for selectively receiving said information signal;

a plurality of information transmission lines for connecting each receiving means to said plurality of transmitting means;

an external synchronizing signal generating means for generating and feeding an external synchronizing signal to said plurality of transmitting means and said plurality of receiving means;

wherein:

each transmitting means includes a distribution circuit for feeding said information signal to said plurality of receiving means through said information transmission lines, each receiving means includes a selection circuit for selectively switching on one or more of said plurality of information transmission lines or switching over from one of said plurality of information transmission lines to another, the switching on or the switching over timing of said information transmission lines in said selection circuits of said plurality of receiving means is synchronized with said external synchronizing signal, and said information signal contains a video signal; and a plurality of video signal generating means for feeding said video signal to said transmitting means;

each video signal generating means including an internal synchronizing signal generation circuit synchronized by said external synchronizing signal, and at least one receiving means further including a video signal processing means for reproducing and/or recording an image corresponding to the video signal contained in said information signal fed from said selection circuit, and wherein:

said external synchronizing signal is a pulse signal having a voltage level higher than the maximum voltage level or lower than the minimum voltage level of said video signal, each transmitting means further includes a circuit for injecting said external synchronizing signal into a transmission line extended from said transmitting means to said video signal generating means, and each video signal generating means further includes a level comparing circuit for extracting said external synchronizing signal by comparing the signal level of said pulse signal with a reference signal having a predetermined voltage level for applying said extracted external synchronizing signal to said internal synchronizing signal generation circuit.

2. An apparatus according to claim 1, wherein transmission line is a transmission line for said video signal, and wherein each transmitting means further includes a circuit for removing said external synchronizing signal from the signal reaching said distribution circuit.

3. An apparatus according to claim 2, wherein each video signal generating means includes an identification code signal generation circuit for generating an identification code signal corresponding to an identification code respectively allotted to said video signal generating means for injecting said identification code signal into said video signal fed to said transmitting means, and wherein at lease one receiving means includes an identification code signal processing means for extracting said identification code signal from a signal outputted from said selection circuit and for feeding a signal corresponding to the extracted identification code signal to said video signal processing means.

4. An apparatus according to claim 2, further comprising:

control means for generating a control signal including a coded control command for controlling said video signal generating means together with annexed identification code signal corresponding to an identification code respectively allotted to each video signal generating means;

wherein said control signal is applied to said video signal generating means to operate a circuit corresponding to said control signal, only when the identification code signal annexed to said control signal corresponds to the identification code signal allotted to said video signal generating means.

5. Apparatus as claimed in claim 2, wherein said transmitting means includes an identification code signal generation circuit for generating an identification code signal corresponding to an identification code respectively allotted to said video signal generating means for injecting said identification code signal into said video signal fed to said transmitting means, and wherein at least one receiving means includes an identification code signal processing means for extracting said identification code signal from a signal outputted from said selection circuit and for feeding a signal corresponding to the extracted identification code signal to said video signal processing means.

6. An apparatus according to claim 1, further comprising:

control means for generating a control signal including a coded control command for controlling said video signal generating means together with annexed identification code signal corresponding to an identification code respectively allotted to each video signal generating mean;

wherein said control signal is applied to said video signal generating means to operate a circuit corresponding to said control signal, only when the identification code signal annexed to said control signal corresponds to the identification code signal allotted to said video signal generating means.

7. An apparatus according to claim 6, wherein said control signal is injected into a said transmission line extended from said transmitting means to said video signal generating means, and wherein said video signal generating means further includes a control signal processing means for extracting said control signal from said transmission line for feeding the extracted control signal to a circuit corresponding to said extracted control signal, when the identification code signal annexed to said control signal corresponds to the identification code allotted to said video signal generating means.

8. An apparatus according to claim 6, wherein each receiving means further includes a control signal driver for feeding said control signal to said plurality of information transmission lines for propagating said control signal in the reverse direction to the propagation direction of said video signal, and wherein each transmitting means further includes a control signal extractor for extracting said control signal from said information transmission line and for feeding the extracted control signal to the corresponding video signal generating means.

9. An apparatus according to claim 8, wherein each transmitting means feeds said control signal to a transmission line for the video signal and the control signal, said transmission line being a line for connecting said transmitting means to said video signal generating means or to a separate control transmission line.

10. An apparatus according to claim 1, wherein each transmitting means further includes a signal mixing means for generating a mixed signal composed of a video signal and an audio signal by injecting the audio signal into said video signal and for feeding said mixed signal to said distribution circuit.

11. An apparatus according to claim 10, wherein each receiving means further includes an audio signal retrieving means for outputting the audio signal by retrieving said audio signal from said mixed signal.

12. An apparatus according to claim 1, further comprising:

a control means respectively arranged for each receiving means for individually controlling said selection circuit; and a master control unit for supervising the state controlled by said control means.

13. An apparatus according to claim 12, wherein said master control unit further controls each of the control circuits of said receiving means and each of the video signal generating means connected to said plurality of transmitting means.

14. An apparatus according to claim 1, wherein each video signal generating means includes an identification code signal generation circuit for generating an identification code signal corresponding to an identification code respectively allotted to said video signal generating means for injecting said identification code signal into said video signal fed to said transmitting means, and wherein at least one receiving means includes an identification code signal processing means for extracting said identification code signal from a signal outputted from said selection circuit and for feeding a signal corresponding to the extracted identification code signal to said video signal processing means.

15. An apparatus according to claim 14, wherein each identification code signal processing means includes a memory for storing identification data for each allotted identification code, an extraction circuit for extracting said identification code signal from said signal outputted from said selection circuit to generate a decoder signal, and a controller for retrieving said identification data pertaining said decoder signal from said memory for superimposing said identification data onto said video signal.

16. An apparatus according to claim 15, further comprising:

a control means respectively arranged for each receiving means for individually controlling said video signal generating means through said information transmission line; and a master control unit for supervising the state controlled by said control means in order to prevent any conflicting control commands or prohibited commands.

17. An apparatus according to claim 16, wherein said master control unit further controls each of the control circuits of said receiving means and each of the video signal generating means connected to said plurality of transmitting means.

18. An apparatus according to claim 15, further comprising:

control means for generating a control signal including a coded control command for controlling said video signal generating means together with annexed identification code signal corresponding to an identification code respectively allotted to each video signal generating means;

wherein said control signal is applied to said video signal generating means to operate a circuit corresponding to said control signal, only when the identification code signal annexed to said control signal corresponds to the identification code signal allotted to said video signal generating means.

19. An apparatus according to claim 16, wherein each receiving means further includes a control signal driver for feeding said control signal to said plurality of information transmission lines for propagating said control signal in the reverse direction to the propagation direction of said video signal, and wherein each transmitting means further includes a control signal extractor for extracting said control signal from said information transmission line and for feeding the extracted control signal to the corresponding video signal generating means.

20. Apparatus as claimed in claim 3, wherein said switching-over timing of said information transmission lines signal is timed to occur during a vertical fly back interval of said video signal.

21. Apparatus as claimed in claim 1, wherein said transmitting means includes an identification code signal generation circuit for generating an identification code signal corresponding to an identification code respectively allotted to said video signal generating means for injecting said identification code signal into said video signal fed to said transmitting means, and wherein at least one receiving means includes an identification code signal processing means for extracting said identification code signal from a signal outputted from said selection circuit and for feeding a signal corresponding to the extracted identification code signal to said video signal processing means.

* * * * *